(No Model.) 2 Sheets—Sheet 1.

E. W. POSTON.
CAR BRAKE AND STARTER.

No. 250,751. Patented Dec. 13, 1881.

Attest.
E. R. Hill
J. Wm. Strehli

Inventor.
Elisha W. Poston
per Wm. Hubbell Fisher
Atty.

(No Model.) 2 Sheets—Sheet 2.

E. W. POSTON.
CAR BRAKE AND STARTER.

No. 250,751. Patented Dec. 13, 1881.

Attest.
E. R. Hill
J. Wm. Strehli

Inventor.
Elisha W. Poston,
per Wm. Hubbell Fisher,
Atty

UNITED STATES PATENT OFFICE.

ELISHA W. POSTON, OF FORT WAYNE, INDIANA, ASSIGNOR OF ONE-HALF TO DAVID B. FISHER, OF SAME PLACE.

CAR BRAKE AND STARTER.

SPECIFICATION forming part of Letters Patent No. 250,751, dated December 13, 1881.

Application filed June 7, 1881. (No model.)

*To all whom it may concern:*

Be it known that I, ELISHA W. POSTON, of the city of Fort Wayne, in the county of Allen and State of Indiana, have invented certain new and useful Improvements in Apparatus for Starting and Stopping Cars, of which the following is a specification.

My invention, while applicable to any description of railroad-cars, is especially adapted to those known as "street-cars."

My invention relates to that class of apparatus which aims to store up the power used in stopping the car and utilizes said power in starting it.
One feature of my invention consists in the novel arrangement and application of springs, which, through the agency of appropriate mechanism, will be strained when the car is stopping, and whose elastic tendency may, when the car is to be started, be employed to set the car in motion.

Various means of utilizing those springs which form the aforesaid feature of my invention may be employed. In the present instance I have employed one preferred form of such mechanism, and the novel arrangement and construction of the same and of its various parts constitute other features of my invention.

Figure 1:
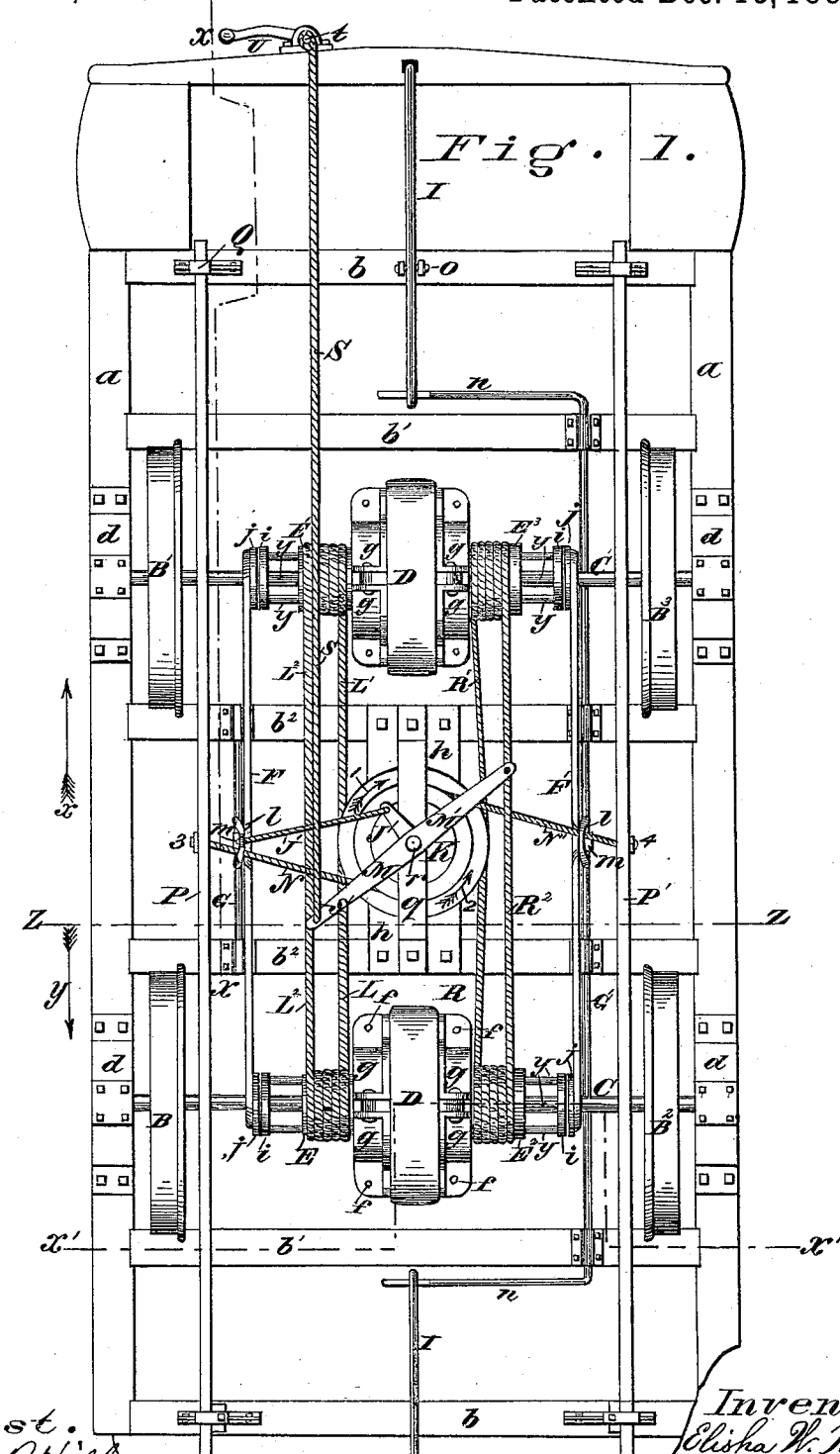
Figure 5:
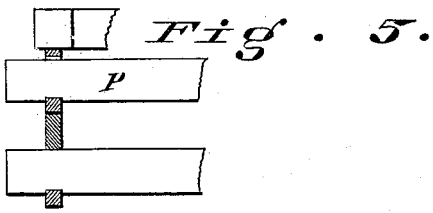
Figure 2:
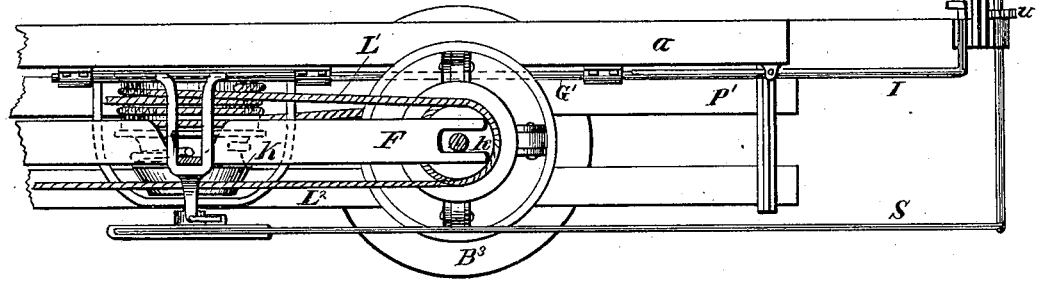
Figure 3:
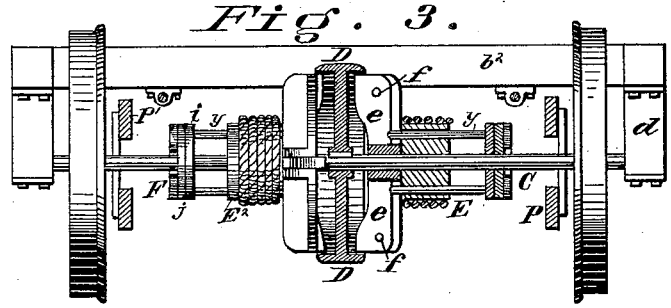
Figure 4:
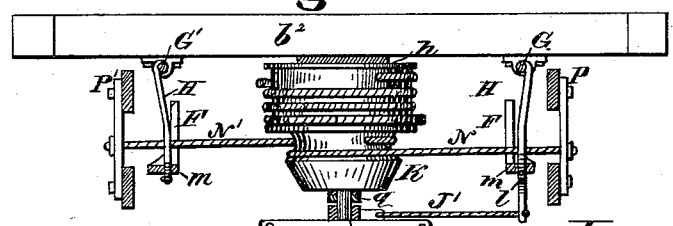

In the accompanying drawings, forming part of this specification, and to which reference is hereby made, Figure 1 represents a view of the bottom of a street-car and of my improvements applied thereto. Fig. 2 is a longitudinal section of the middle and one end of said car, taken at the line $x\,x$ of Fig. 1, and looking toward that side of the car which is on the right hand in Fig. 1. Fig. 3 is a front elevation of one pair of the wheels of said car and their axle and that portion of my improved mechanism which is located thereon, that portion of the mechanism which is at the right hand of the center and including the central friction-wheel being shown in vertical central section. Fig. 4 is a vertical cross-section of the car, taken at the line $z\,z$ of Fig. 1, and looking toward that end of the car which is at the bottom in Fig. 1; and Fig. 5 is an elevation of the ends of one of the side springs.

A indicates the platform of the car, consist-
ing of side sills, $a\,a$, and end sills, $b\,b$, and cross-sills, $b'\,b'\,b^2\,b^2$, properly covered with flooring.

B B' B² B³ are the usual supporting-wheels, wheels B and B² being fixed on axle C and wheels B' and B³ being fixed on axle C'. Each axle is respectively journaled at either side in boxes $d$ depending from the sills $a$, in any of the usual modes. On each axle is rigidly fixed a friction-wheel, D, whose surface at the periphery extends outward on both sides of the central plane of the wheel, so as to overlap the top of the levers $e$ of the friction-clutches and afford a convenient surface for the said levers to act upon. These levers $e$ are each fulcrumed on a pivot, $f$, which latter rests in and holds together the adjacent segmental pieces $g$, and the levers $e$ work between said pieces. Outside of each set of these segmental pieces, and adjacent thereto, is a pulley. These pulleys are respectively designated and distinguished by the letters E E' E² E³, the pulleys E E² being located upon axle C and pulleys E' E³ being located upon axle C', each pulley being concentric with its respective shaft and turning thereon.

The immediate means for operating upon the levers $e$ of the friction-clutch consist of the rods $y$, which pass through the pulley, and each at its inner end impinges against its respective lever $e$. At their outer ends the several rods $y$ of each clutch are attached to a disk or bearing plate, $i$, arranged to slide on the axle to which it is connected, and facing a washer or disk, $j$, centered on and sliding upon the axles.

A connecting piece or rod, F, extends from one axle to the other and beyond, each axle being received in a slot, $k$, one of which latter is formed in either end of this rod F, and in this way the rod is sustained. One such rod F is located at one side of the gearing, and its ends rest against the adjacent washers $j$, and another such rod F is located at the other side of the car, and its ends rest against the adjacent washers $j$.

G designates a rod on one side, and G' a rod on the other side, of the car. The ends of each of these rods G and G' are supported by the cross-sills $b^2$ and turn in journal boxes or bearings connected to said sills. Each rod has an arm, H, (see Fig. 4,) which extends downward outside of the adjacent piece F, and is provided with an eye, $l$, which fits over a stud, $m$, on the adjacent piece F F. The rod G′ is extended out to each end of the car, and is there provided with a crank, $n$, the loose end of which latter is raised by a lever, I, fulcrumed on a pivot, $o$, connected to the cross-sill $b$, the outer end of the lever being bent at right angles and extending up through the platform of the car, and terminating in a treadle, W, so located and adapted as to be worked by the driver of the animals employed to pull the car.

Located in the center of the car, and between the axles, is the drum or pulley K, the upper end of whose shaft is journaled in a bearing-plate, $h$, bolted to the sills $b^2$, and whose lower end, $r$, is journaled in the bottom of the strap $q$, which latter extends up on each side of the pulley, and is bolted to the sills $b^2$ through the plate $h$. This lower end, $r$, of the shaft extends through and below the bottom of said strap, and upon said end $r$ is affixed the lever having arms J and M and M′. The end of lever J is connected to the eye $l$ of arm H of rod G by a cord or chain, J′. The lever M is operated by means of the ordinary brake-chain S, wound upon arm $t$, operated by crank-rod U. Lever M′ is operated by a similar brake-chain attached to the loose end of said lever and wound upon a brake-drum operated by a brake-crank located at that end of the car which is at the bottom in Fig. 1, said brake chain and drum and crank not being shown therein, being a mere repetition of those shown at the top in Fig. 1. Thus when either lever M or M′ is moved in the direction of the arrow numbered 1 said lever will operate to press piece F against the washers $j$ and the washers $j$ against the disks $i$, and thus cause the rods $y$ to push the friction-levers $e$ against the rim of the friction-wheel and cause the car-wheel axle C, while rotating, to turn pulley E, and axle C′, while rotating, to turn pulley E′, thereby, when the car is running in the direction indicated by marginal arrow $y$, operating to wind the cord or chain L upon pulley E and unwind cord L from pulley E′, and at same time unwind cord L from the drum K, thereby turning the latter in the direction of the peripheral arrow numbered 2, the slack of the cord $L^2$ being at the same time wound off of pulley E and upon pulley E′. The turning of the drum in the direction of arrow No. 2 operates to wind up the cords or chain N N′. Cord N is attached at 3 to the middle of one pair of longitudinal springs, P, and cord N′ to the middle of the other pair of longitudinal springs, P′. One pair of these springs is located at one side of the car and the other pair at the other side of the car. Each pair is supported at either end by a hanger, Q, bolted securely to the end sill, $b$ (see Figs. 1 and 5,) the one spring of a pair being preferably placed over the other of the same pair. Consequently, as cord N is wound up, it operates to bend the springs P toward the center of the car, and as the cord N′ is wound up it operates to bend the springs P′ toward the center of the car, and thus both pairs of springs are strained.

It will be apparent that the winding up of the cords N N′ and the straining of the springs P P′ through the agency of the rotation of the car-wheels will operate as a brake to stop the forward motion of the car, and as the springs are more and more strained their resistance to the rotation of the wheels and the onward movement of the car is increased, and thus the car is effectually braked. The car being stopped and the springs being bent inward, much of the power otherwise lost in stopping the car is stored up ready for use, and can be kept stored as long as desired by keeping the brake-chain S wound upon drum $t$ (see Fig. 1) by setting the usual pawl into the ratchet-wheel $u$, fixed on the crank-rod U. At the same time the treadle W is depressed, and the loose end of crank $n$ is thus raised and the rod G′ turned, causing the arm H to bear against the piece F, which latter, in turn, bears against the adjacent washers $j$, which latter press against the disks $i$ and cause the rods $y$ to operate the levers $e$ and crowd the latter against their respective shells or wheels D, and thereby clutch the said wheels. This treadle acts to prevent (through the agency of the clutches it operates) the car-wheels from rotating in such a direction as would cause the car to run backward, and thus prevents the power acquired from being expended until utilized, if desired, by the person having charge of the starting of the car. When it is desired to start the car forward the brake-chain S is now permitted to unwind, releasing the pressure upon piece F and the clutches which it operates, and thereby no longer acting as a brake upon the vehicle. The springs P P′ are now free to exert their force through the agency of their respective cords or chains N N′ and operate to turn the drum in the direction of the peripheral arrow No. 1, and the drum unwinds the rope or chain R′ from pulley $E^2$ and winds rope or chain R′ on pulley $E^3$, the rope $R^2$ winding up on pulley $E^3$ and winding off of the pulley $E^2$, thereby starting the car in the direction of the marginal arrow $y$, and the car will be impelled forward till the springs P P′ have expended their force.

Should it upon any occasion be desirable not to utilize the power of the springs after the latter have been strained or bent, the desired result can be accomplished by not using the treadle, but by unwinding the brake-drum and slackening the brake-chain, when the friction-clutches, operated by the said brake-chain, will be loosened from the pulley-wheel D, and the pulleys E E′, being free to turn on their respective shafts, will do so, and allow the drum to be turned and the springs P P′ to unwind the rope N N′ from the drum. Thus the springs P P′ will return to their normal position without starting the car.

When the car is running in the direction indicated by the marginal arrow X, a brake-chain connected at one end to the end M' of the lever J M M' and at the other end to the drum of a crank or brake rod located at that end of the car which is at the bottom of the drawings in Fig. 1 is employed, and upon being wound upon the drum causes lever J, through the agency of the cord J', to press the friction-clutches on its side of the car against the wheels D, and thereby cause the springs to be bent and the car braked and the power stored, as before mentioned, the operations of winding and unwinding the cords making a part of said mechanism aforementioned being simply reversed. At the same time the treadle at the end of the car must be depressed, and thus the friction-clutches adjacent to rod F will be caused to clutch their respective pulley-wheels D, and the power stored and the car prevented from making a retrograde movement. The taut brake-chain being loosened, the power will be started in the manner hereinbefore mentioned. the operations of winding and unwinding the various cords making a part of this mechanism being reversed.

The direction in which the car shall start after the power has been stored is dependent upon the releasing of the treadle or the hand-brake. If the hand-brake is released, a forward movement is secured. If the treadle is released, a backward movement is obtained. The treadle, on being depressed, must so remain until after the starting of the car has been accomplished. This treadle is preferably provided with some suitable form of device for holding the treadle in a depressed position after the foot of the operator has been removed, and also for enabling the operator to easily and quickly release the treadle and enable it (the treadle) to be elevated. A preferable form of such device is shown in Fig. 2. A vertical notched rack is fixed to the dash-board. A foot-piece is fixed upon the vertical arm of the treadle-rod I, and is capable of being rotated on the latter by the foot of the operator in a horizontal direction. Thus by depressing the treadle and turning the foot-plate in the direction of the arrow the edge of the plate will come under a notch or tooth of the ratchet, and the foot may now be removed, and the treadle will be held down until such time as the operator desires to allow it to be elevated, when he again places his foot on the treadle and, further slightly depressing it, turns the plate in a direction the reverse of that indicated by the arrow, and, releasing the pressure of his foot, allows the treadle to be elevated and the hold of its clutches on the pulley-wheels released.

The operations of the car-driver in starting the car are, in brief, as follows: To start the car forward when it has been properly braked and stopped and power stored, the hand-brake only is released, while the treadle remains down until the starting is accomplished, when said treadle must be released. Otherwise it would, after the springs had attained their normal position, act as a brake and stop the car. In starting backward the foot-lever is first released, and when the car is started the hand-brake is released to prevent the car being again braked.

The rapidity with which the car may be braked and the springs bent is regulated by the size of the pulleys E E'. The larger said pulleys are the more quickly said car is braked and the springs bent and the power stored. The same desired results can be obtained by altering the size of the drum K, and also to changing the relative diameter of that portion of said drum which takes the cords or chains N and N' to that portion which takes the cords or chains L L'. Similar changes in the diameter of the pulleys $E^2$ $E^3$, or of the drum K, or also of the relative diameter of that portion of said drum which takes the cords N N' to that portion which takes the cords or chains R R', will enable the stored power to be expended more or less rapidly and the car started quicker or slower.

The amount of power stored and the amount of braking resistance applied to the car can be regulated in some degree by the amount of strain applied to the brake-chain. For example, if the chain is but slightly tightened, the clutches will slip after the springs have been bent a very little, and no additional power stored or increased braking resistance will after that be offered to the progress of the car.

Instead of pairs of springs, but one single spring on each side may be used; or one spring only on one side may be used. In the last-mentioned case slight modifications of the present device will be necessary. These longitudinal springs are preferably made of wood, are strong, cheap, easy of adjustment, and capable of great resiliency. They constitute an important feature of my invention, and this feature is capable of being employed in connection with other mechanism for braking, storing the power, and starting the car than that herein shown.

Obviously the mechanism located about and on one of the axles can (with slight modifications of the remaining mechanism) be dispensed with, and the said remaining mechanism, in combination with the longitudinal spring or springs, be operated and capable of good results. Also, one brake and one treadle can be dispensed with when desired. The washers j may also be dispensed with when desired. Chains may, whenever desired, be employed in lieu of the cords hereinbefore described.

What I claim as new and of my invention, and desire to secure by Letters Patent, is—

1. The longitudinal bar or rod springs P P', running with the length of the car, in combination with suitable mechanism for straining the springs, storing the power, and starting the car, substantially as and for the purposes specified.

2. The combination of the longitudinal bar or rod springs, drum K, pulleys E E' E² E³, and friction-clutches, and axles C C', and connecting and operating mechanism, substantially as and for the purposes specified.

3. The combination of the longitudinal bar or rod springs, drum K, pulleys, as E, friction-clutches, and connecting and operating mechanism, substantially as and for the purposes specified.

4. The combination of the longitudinal bar or rod springs, drum K, cords N N', rods G G', arms H, pieces F F, cord J', lever J M M', cords or chains L L' R R' R², pulleys E E' E² E³, washers $j$, friction-clutches composed of rods $y$, levers $e$, wheels D, axles C, brake chain, drum, and crank, lever $n$, and treadle W, with lever I, substantially as and for the purposes specified.

ELISHA W. POSTON.

Witnesses:
A. A. PURMAN,
D. B. FISHER.